United States Patent [19]

Fairborn

[11] Patent Number: 5,005,666
[45] Date of Patent: Apr. 9, 1991

[54] ATTENUATION OF BOREHOLE TUBE-WAVES

[75] Inventor: John W. Fairborn, Newport Beach, Calif.

[73] Assignee: Chevron Research and Technology Company, San Francisco, Calif.

[21] Appl. No.: 511,112

[22] Filed: Apr. 19, 1990

[51] Int. Cl.⁵ .............................................. G01V 1/40
[52] U.S. Cl. .................................. 181/102; 181/105; 367/57; 367/35; 367/86; 175/50; 73/152
[58] Field of Search ..................... 367/25, 57, 86, 911, 367/35, 36, 37; 181/101, 102, 104, 105; 175/50; 73/152

[56] References Cited

U.S. PATENT DOCUMENTS

| | | | |
|---|---|---|---|
| 2,191,119 | 2/1990 | Schlumberger et al. | 181/0.5 |
| 2,350,371 | 6/1944 | Smith | 367/25 |
| 3,054,471 | 9/1962 | Knudsen | 181/0.5 |
| 3,982,606 | 9/1976 | Berry et al. | 181/102 |
| 4,353,122 | 10/1982 | Cubberly, Jr. | 367/25 |

OTHER PUBLICATIONS

W. B. Beydoun, et al, "Detection of Open Fractures with Vertical Seismic Profiling", *Journal of Geophysical Research,* vol. 90, No. B6, May 10, 1985, pp. 4557–4566.

*Primary Examiner*—Charles T. Jordan
*Assistant Examiner*—J. Woodrow Eldred
*Attorney, Agent, or Firm*—Edward J. Keeling; Ernest A. Schaal

[57] ABSTRACT

An apparatus is disclosed for use within a borehole for seismic surveying that has a vertical array of seismic receivers connected to a cable, a top inflatable bladder connected to the cable above the top seismic receiver, and a bottom inflatable bladder connected to the cable below the bottom seismic receiver. The top bladder acoustically isolates all seismic receivers from the borehole environment above the top bladder. The bottom bladder acoustically isolates all seismic receivers from the borehole environment below the bottom bladder. Additional inflatable bladders are placed between each separate seismic receiver in the array.

11 Claims, 2 Drawing Sheets ness of such a device. It

ATTENUATION OF BOREHOLE TUBE-WAVES

The present invention relates to methods and apparatuses for attenuation of borehole tube-waves.

BACKGROUND OF THE INVENTION

High amplitude tube-waves hamper seismic measurements in boreholes. By "tube-wave," we mean a Stonely wave that propagates along a borehole with a wavelength much greater than the diameter of the borehole. These tube-waves are created by the coupling of seismic waves in a liquid-filled borehole. They propagate within the borehole with very little attenuation.

In a seismic borehole survey many different seismic waves intersect the borehole, including the direct P and S waves, surface waves, and reflected P and S waves. Each of these waves generates tube-waves inside the borehole. In addition, tube-waves are reflected at the bottom of the well, at the top of the liquid column, at lithologic boundaries, and at changes in the borehole diameter. These tube-waves are generally recognized as high amplitude coherent wavetrains, but as the innumerable low amplitude tube-waves interfere with one another, they also create a background of incoherent seismic noise.

Because of these tube-waves, borehole seismic measurements are usually made with geophones, which can be tightly clamped to the borehole wall making them less sensitive to tube-wave motion. If it were not for the tube-waves, hydrophones would be preferred over geophones because a large number of hydrophones can be deployed at the same time, thereby shortening the time required to conduct the survey. Unfortunately, hydrophones are not clamped to the borehole wall and are thus much more sensitive to tube-wave noise than are geophones. In fact, this noise so dominates the record that hydrophones are seldom used in borehole seismic surveys.

SUMMARY OF THE INVENTION

The present invention involves an apparatus for use within a borehole for seismic surveying that attenuates the borehole tube-waves. That apparatus comprises at least one seismic receiver connected to a cable, a top inflatable bladder connected to the cable above the top seismic receiver, and a bottom inflatable bladder connected to the cable below the bottom seismic receiver. The top bladder acoustically isolates all seismic receivers from the borehole environment above the top bladder, and the bottom bladder acoustically isolates all seismic receivers from the borehole environment below the bottom bladder.

Preferably, an array of seismic receivers is used and there are inflatable bladders between each separate seismic receiver in the array. The receivers can be hydrophones or geophones. The cable can be a wireline.

One method of using the present invention is by lowering at least one seismic receiver into a borehole, acoustically isolating all seismic receivers from the borehole environment above the receivers, acoustically isolating all seismic receivers from the borehole environment below the receivers, and measuring seismic signals received by all the seismic receivers. Preferably, an array of seismic receivers is used, with all seismic receivers being acoustically isolated from each other.

BRIEF DESCRIPTION OF THE DRAWINGS

In order to facilitate the understanding of this invention, reference will now be made to the appended drawings of the preferred embodiments of the present invention. The drawings are exemplary only, and should not be construed as limiting the invention.

DETAILED DESCRIPTION OF THE PREFERRED EMBODIMENTS

In its broadest aspect, the present invention involves an apparatus for use within a borehole for seismic surveying. That apparatus has at least one seismic receiver connected to a cable. Above the top seismic receiver is a top inflatable bladder that acoustically isolates all seismic receivers from the environment above the top bladder. Below the bottom seismic receiver is a bottom inflatable bladder that acoustically isolates all seismic receivers from the borehole environment below said bottom bladder.

Figure 1:
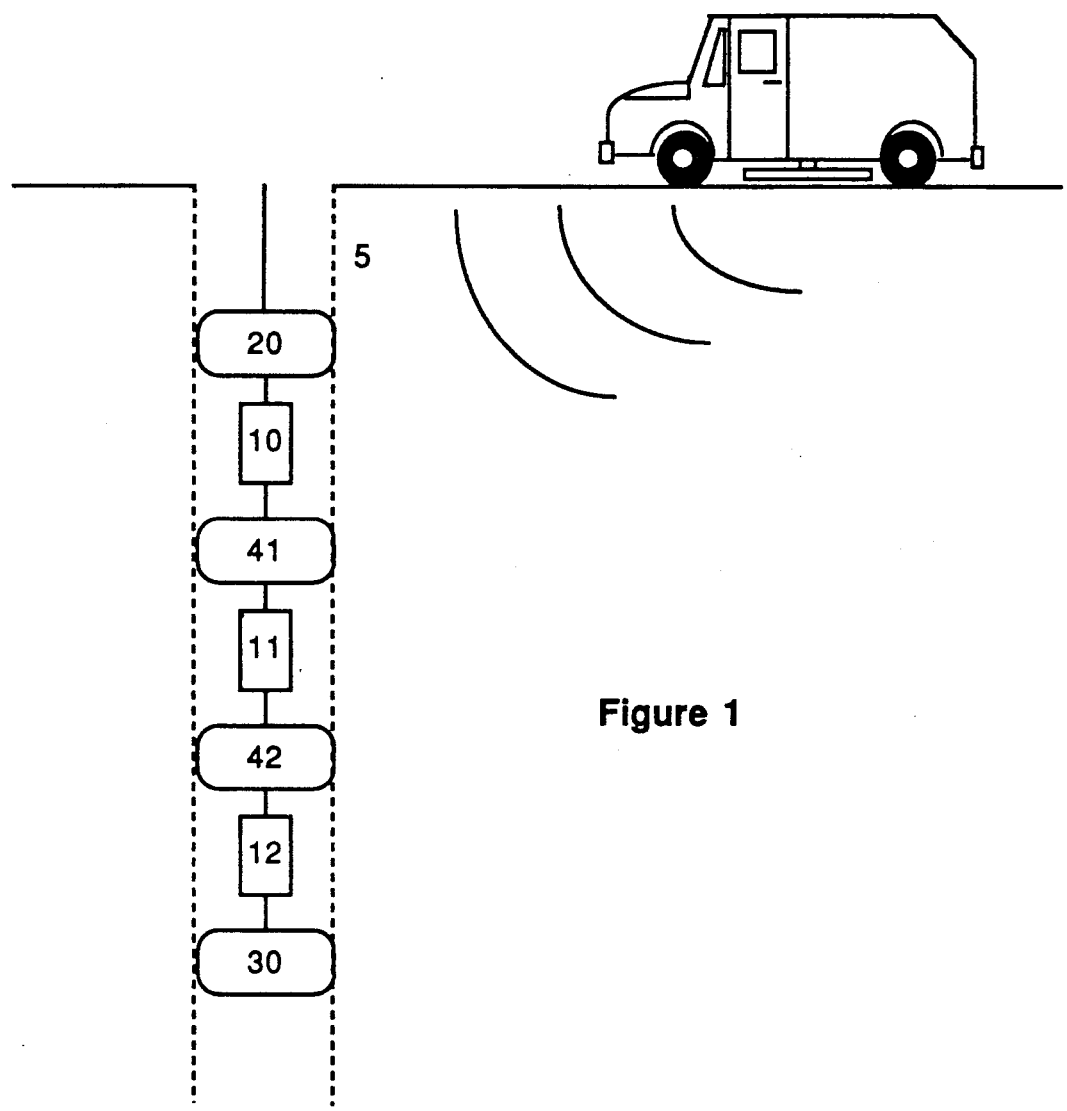
FIG. 1 is a schematic drawing of one embodiment of the present invention.

Referring to FIG. 1, hydrophones 10, 11, and 12 are lowered into borehole 5. Inflatable bladder 20 isolates all the hydrophones from the borehole environment above the hydrophones. Inflatable bladder 30 isolates all the hydrophones from the borehole environment below the hydrophones. Inflatable bladders 41 and 42 isolate the hydrophones from each other.

Figure 2:
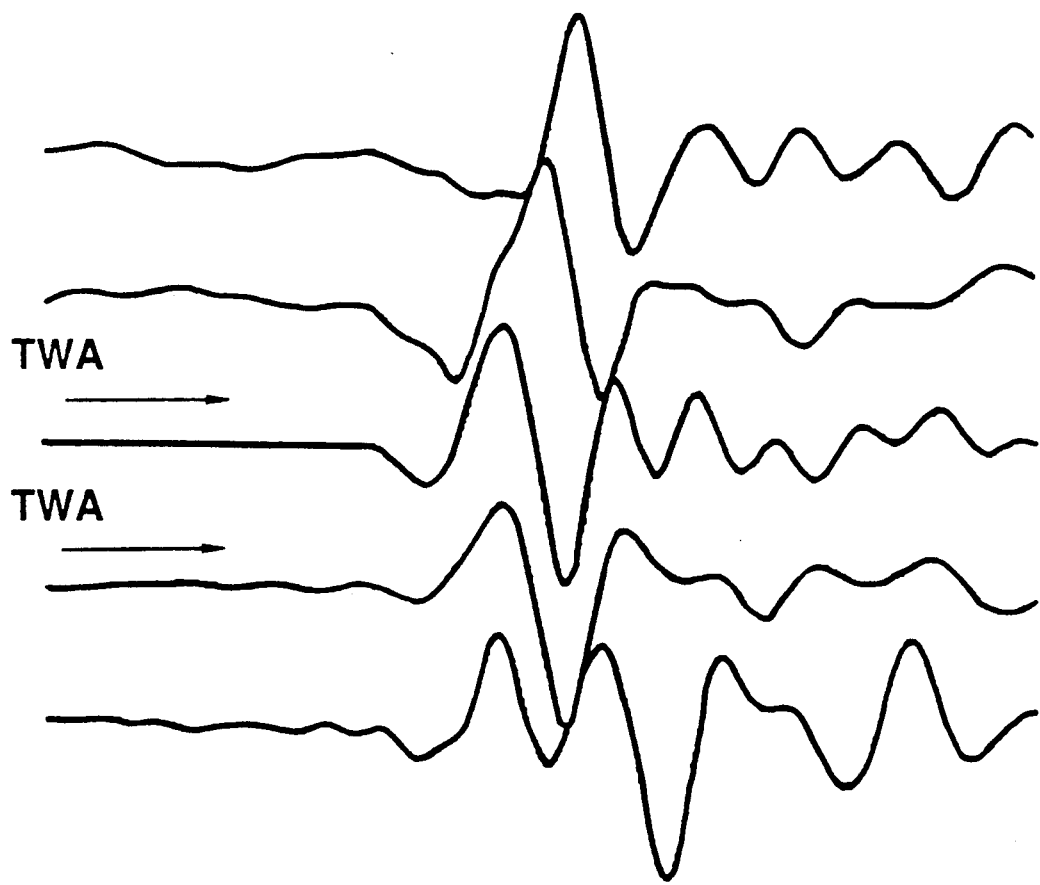
FIG. 2 is a plot of P-wave arrivals recorded on a downhole hydrophone array.

FIG. 2 illustrates the effectiveness of such a device. It shows five traces from a hydrophone array in which the middle hydrophone has been isolated by two such bladders. The lower noise level on the isolated trace results in a better-defined onset time of the P-wave signal and a waveform that is not distorted by tube-wave noise.

SEISMIC RECEIVERS

At least one seismic receiver is used connected to a cable. By "seismic receiver," we mean a device that transforms mechanical motion, or energy, into an electrical voltage.

Types of seismic receivers that would work in the present invention include, but are not limited to, hydrophones and geophones. By "hydrophones," we mean devices that are sensitive to variations in pressure. By "geophones," we mean devices that are sensitive to variations in particle velocity.

Preferably, more than one seismic receiver is used and those receivers are in an array. In most applications, that array of seismic receivers would be vertical, but the array could also be slanted or horizontal, depending upon the orientation of the well. For best results, inflatable bladders are placed between each separate seismic receiver in the array.

CABLE

By "cable," we mean an assembly of electrical conductors and high-tensile strength members used to support the seismic receivers and transmit the electric signals from the seismic receivers to the recording system. The cable can be a wireline of the type used to support a well logging sonde.

One method of using the present invention is by lowering at least one seismic receiver into a borehole, acoustically isolating all seismic receivers from the borehole environment above the receivers, acoustically isolating all seismic receivers from the borehole environment below the receivers, and measuring seismic signals received by all the seismic receivers.

Preferably, an array of seismic receivers is used, with each seismic receiver acoustically isolated from each other. The seismic receivers can be acoustically isolated by use of inflatable bladders.

In one preferred embodiment, the seismic receivers are used to indicate the presence of fractures. This is accomplished by the phenomenon described by workers such as Beydoun, Cheng and Toksoz (1985) in which incident P waves can compress open liquid-filled fractures that intersect the borehole. This compression causes a pulse of liquid to be injected into the borehole, which in turn causes a tube-wave to be generated. If the tube-wave amplitude is small it will not be detected because of the high noise level created by the innumerable other tube-waves propagating up and down the borehole. Inflatable bladders described in this invention will acoustically isolate the seismic receivers from this background tube-wave noise. Consequently, any seismic receiver placed in the vicinity of the open fractures so as not to be separated from it by an inflatable bladder will detect the tube-wave generated by the fracture.

While the present invention has been described with reference to specific embodiments, this application is intended to cover those various changes and substitutions which may be made by those skilled in the art without departing from the spirit and scope of the appended claims.

What is claimed is:

1. An apparatus for use within a borehole for seismic surveying comprising:
   (a) at least one seismic receiver connected to a cable,
   (b) a top inflatable bladder connected to the cable above the top seismic receiver, wherein said top bladder acoustically isolates all seismic receivers from the borehole environment above said top bladder, and
   (c) a bottom inflatable bladder connected to the cable below the bottom seismic receiver, wherein said bottom bladder acoustically isolates all seismic receivers from the borehole environment below said bottom bladder.

2. An apparatus according to claim 1 wherein said at least one seismic receiver comprises an array of seismic receivers.

3. An apparatus according to claim 2 further comprising inflatable bladders between each separate seismic receiver in the array.

4. An apparatus according to claim 2 wherein said array of seismic receivers is a vertical array of seismic receivers.

5. An apparatus according to claim 1 wherein said seismic receiver is a hydrophone.

6. An apparatus according to claim 1 wherein said seismic receiver is a geophone.

7. An apparatus according to claim 1 wherein said cable is a wireline.

8. A method for seismic surveying comprising:
   (a) lowering at least one seismic receiver into a borehole;
   (b) acoustically isolating all seismic receivers from the borehole environment above said receivers, wherein said seismic receivers are acoustically isolated by use of inflatable bladders;
   (c) acoustically isolating all seismic receivers from the borehole environment below said receivers, wherein said seismic receivers are acoustically isolated by use of inflatable bladders; and
   (d) measuring seismic signals received by all seismic receivers.

9. The method according to claim 8 wherein said seismic receiver comprises an array of seismic receivers.

10. The method according to claim 9 further comprising the step of acoustically isolating all seismic receivers from each other.

11. The method according to claim 8 wherein said seismic receivers are used to indicate the presence of fractures.

* * * * *